US011940145B1

(12) United States Patent
Talakic et al.

(10) Patent No.: US 11,940,145 B1
(45) Date of Patent: Mar. 26, 2024

(54) ILLUMINATED BOOK LIGHTING DEVICE

(71) Applicants: Ines Talakic, Rovereto (IT); Ena Talakic, Rovereto (IT)

(72) Inventors: Ines Talakic, Rovereto (IT); Ena Talakic, Rovereto (IT)

( * ) Notice: Subject to any disclaimer, the term of this patent is extended or adjusted under 35 U.S.C. 154(b) by 0 days.

(21) Appl. No.: 18/212,649

(22) Filed: Jun. 21, 2023

(51) Int. Cl.

| | |
|---|---|
| ***F21V 7/18*** | (2006.01) |
| ***F21S 6/00*** | (2006.01) |
| ***F21S 9/02*** | (2006.01) |
| ***F21V 3/02*** | (2006.01) |
| ***F21V 23/04*** | (2006.01) |
| ***F21Y 115/10*** | (2016.01) |
| ***H05B 47/165*** | (2020.01) |

(52) U.S. Cl.
CPC .................................... *F21V 7/18* (2013.01); *F21S 9/02* (2013.01); *F21V 3/02* (2013.01); *F21V 23/0492* (2013.01); *H05B 47/165* (2020.01); *F21S 6/002* (2013.01); *F21Y 2115/10* (2016.08)

(58) Field of Classification Search
CPC .......... F21S 6/002; F21S 9/02; H05B 47/165; F21V 3/02; F21V 7/18; F21V 23/0492
See application file for complete search history.

(56) References Cited

U.S. PATENT DOCUMENTS 2,483,901 A * 10/1949 Harris .................... G09F 13/12 40/442
4,952,004 A * 8/1990 Baird .................... G02B 27/08 359/616
5,864,973 A * 2/1999 Cole .................... B42D 15/042 40/124.11
6,976,678 B1 * 12/2005 Setteducati ........... A63F 9/0613 273/153 R
8,021,238 B2 * 9/2011 White ....................... B44F 1/02 472/63
10,076,176 B2 * 9/2018 Yang .................... F21V 33/004
11,607,069 B2 * 3/2023 Hudson .................. A47G 33/06
2004/0020509 A1 * 2/2004 Waisman ............... A45D 42/10 132/316
2020/0085170 A1 * 3/2020 Yang .................... G06F 3/0412

* cited by examiner

*Primary Examiner* — Arman B Fallahkhair
(74) *Attorney, Agent, or Firm* — H. Jay Spiegel

(57) ABSTRACT

A lighting device has a rectangular cubic shape and includes "leaves" which may be pivoted between closed and opened positions. Three separate options for illumination devices are included which are all unique and differ from one another. Illumination means is operated by a switch that closes a circuit activating illumination when a leaf is opened and opening the circuit thereby stopping illumination when a leaf is closed. The illumination means for each leaf consists of one or more LEDs. Known technology allowing the LEDs to change colors and to be dimmed or brightened may suitably be employed. If desired, artificial intelligence (AI) technology may be incorporated into the lighting device. For example, the device can be operated using voice prompts to dim or brighten LEDs, illuminate them or stop illumination and change colors. A dedicated phone App can be utilized in controlling the various modes of operation of the invention.

19 Claims, 13 Drawing Sheets

ILLUMINATED BOOK LIGHTING DEVICE

BACKGROUND OF THE INVENTION

The present invention relates to an illuminated book lighting device. In the prior art, lighting devices of various kinds are very well known and have diverse structures, functions, and aesthetic appearances. Some such lighting devices are battery powered and others require a plug in to a source of AC power to be operable. Others include the possibility that a source of AC power may be transformed to direct current (DC) to facilitate operation where an internal battery is to be bypassed.

Styling of a lighting device is often an important aspect of being able to market it to consumers. Various materials are employed in creating a marketable style in a lighting device. Different colors are employed as well as differing types of lights incorporated therein.

There is currently a push to provide electrical appliances and devices which utilize less and less current because this provides lower strain on the electrical grid. In this regard, many lighting devices and other devices utilize rechargeable batteries so that they can be self-contained away from a source of power other than their internal power supply. This provides portability in that such a device may be utilized remotely from the power grid and, if conveniently sized, can be easily transported. It is with these aspects and features in mind that the present invention was conceived.

SUMMARY OF THE INVENTION

The present invention relates to an illuminated book lighting device. The present invention includes the following interrelated objects, aspects, and features:

(1) In a first aspect, in the preferred embodiment, the present invention resembles a book taking on a rectangular cubic shape and includes "leaves" which may be pivoted between closed and opened positions.

(2) In the preferred embodiment, the present invention includes three separate options for illumination devices which are all unique and differ from one another. Of course, fewer or more such options may be employed.

(3) A first such option includes a mirrored surface that includes a shape that looks like one-half of a lamp with a lampshade, bisected vertically. The other surface visible when the leaf is opened is, in fact, also a mirrored surface which shows a symmetrical reflection of the bisected lamp half so that together they appear to show a full lamp with a base and lampshade. The entire half image on the first-mentioned surface is illuminated and the reflection on the other surface causes the appearance to be that of an entire lamp that is illuminated.

(4) Applicants note that the illumination means is operated by a switch that closes a circuit activating illumination when the leaf is opened and opening the circuit thereby stopping illumination when the leaf is closed.

(5) In a second option, once the first leaf is closed, a second leaf may be opened which includes a framework that becomes exposed and has a plurality of LEDs along its legs. When the second leaf is opened, the framework is "erected" and the LEDs are illuminated. Each of the two exposed surfaces of this leaf have mirrored surfaces that provide an interesting and aesthetically pleasing image including the framework looking like it has plural areas which are visible within the mirrored surfaces.

(6) In a third option, once the second option is closed and the framework folded therewithin, a third leaf may be opened which exposes two mirrored surfaces and a flexible object forming a unique shape and preferably made of a material such as parchment which has accordion pleats that allow it to be expanded to the open position and collapsed in the closed position. As before, when this leaf is opened, a switch is closed which causes illumination of the parchment structure which provides an aesthetically pleasing illumination means with additional aesthetic effects caused by the mirrored surfaces to either side of the parchment structure.

(7) In the preferred embodiment of the present invention, the illumination means for each leaf consists of one or more LEDs. If desired, known technology allowing the LEDs to change colors and to be dimmed or brightened may suitably be employed.

(8) Additionally, if desired, artificial intelligence (AI) technology may be incorporated into the inventive lighting device. For example, the device can be operated using voice prompts to dim or brighten LEDs, illuminate them or stop illumination and change colors. A dedicated phone App can be utilized in controlling the various modes of operation of the present invention.

As such, it is a first object of the present invention to provide an illuminated book lighting device.

It is a further object of the present invention to provide such a device which may be operated by battery power or by AC power transformed to DC.

It is a yet further object of the present invention to provide such a lighting device in which the book-like appearance includes three leaves which may be alternatively opened to provide differing lighting effects.

It is a still further object of the present invention to provide such a device in which light emitting diodes (LEDs) are employed as the illumination devices.

It is a still further object of the present invention to provide such a lighting device in which mirrored surfaces enhance aesthetic effects.

It is a still further object of the present invention to provide such a lighting device in which light color changes may occur.

It is a still further object of the present invention to provide such a lighting device in which one lighting option includes a framework with legs covered with LEDs.

It is a still further object of the present invention to provide such a lighting device in which one option may include a parchment structure with accordion pleats.

It is a still further object of the present invention to provide such a lighting device in which a dimmer may be incorporated into the electrical circuitry to allow brightening and dimming the illumination effects.

It is a still further object of the present invention to provide such a lighting device in which AI integration and voice activation may be employed.

These and other objects, aspects, and features of the present invention will be better understood from the following detailed description of the preferred embodiment when considered in conjunction with the appended drawing figures.

SPECIFIC DESCRIPTION OF THE PREFERRED EMBODIMENT

Figure 1:
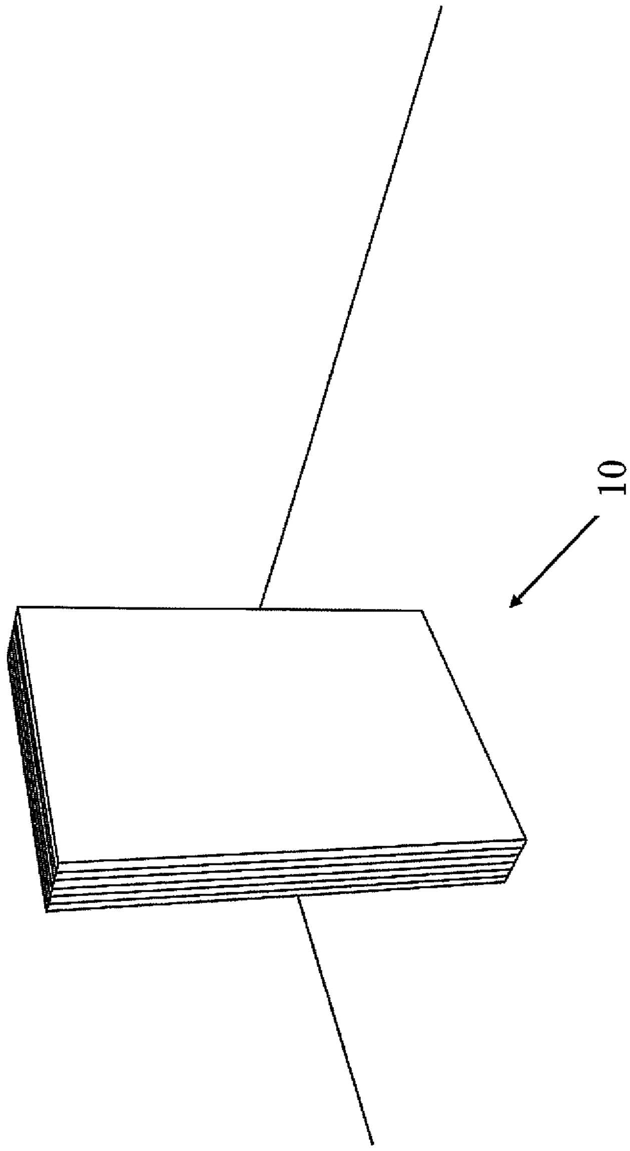
FIG. 1 shows a perspective view of the inventive lighting device with all leaves in the closed position.

With reference first to FIG. 1, the present invention is generally designated by the reference numeral 10 and is seen, in the preferred embodiment, to consist of a rectangular cubic device with a plurality of leaves that may be sequentially opened for the purposes of the present invention.

Figure 2:
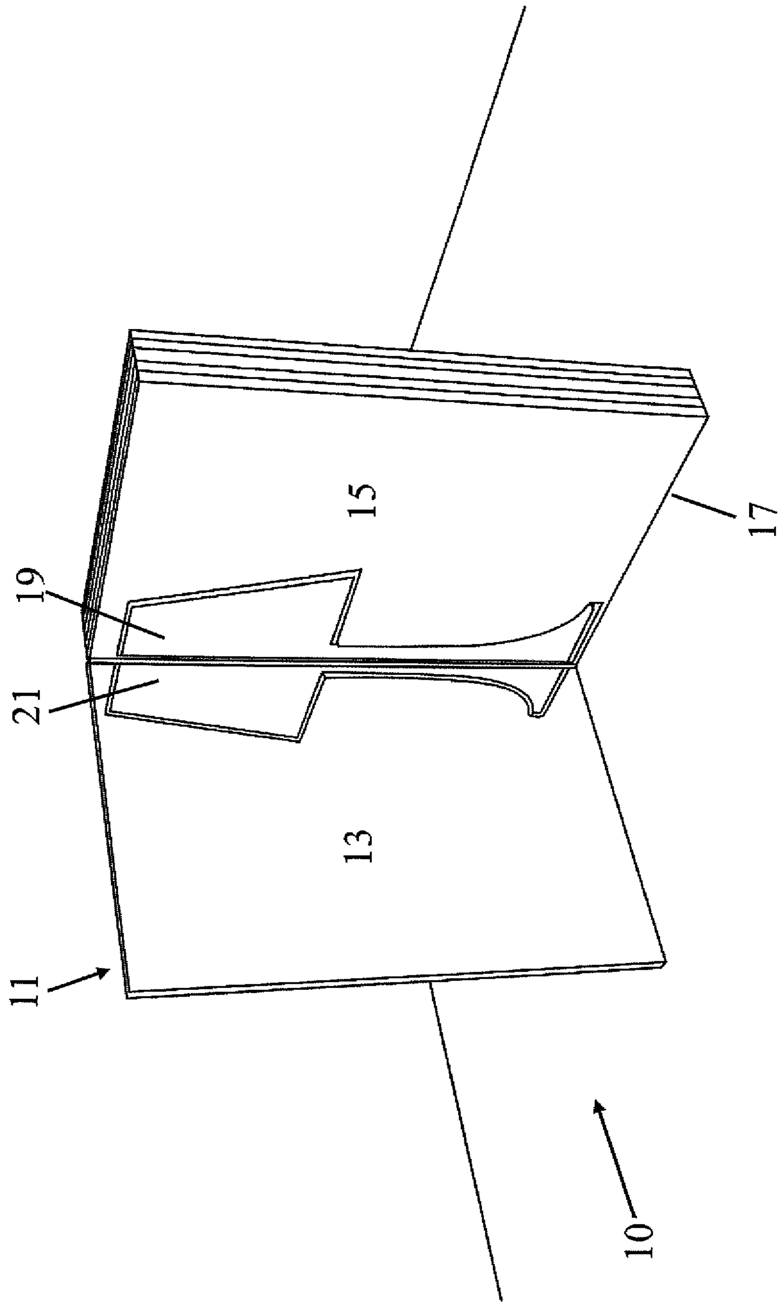
FIG. 2 shows a perspective view of the inventive lighting device with a first leaf opened to show a first option of lighting.

With reference to FIG. 2, a first leaf 11 is seen pivoted about hinge 36 located on an edge of the leaf (FIG. 9) from the position shown in FIG. 1 to an opened position with the leaf 11 having a mirrored surface 13. The facing surface 15 of the second leaf 17 is also mirrored and includes an area 19 which may be illuminated via a source of illumination not shown in FIG. 2. FIG. 2 shows the area 19 illuminated and also shows the reflection 21 of the illuminated area 19 visible within the mirrored surface 13. As will be explained in greater detail hereinafter, when the leaf 11 is pivoted to the position shown in FIG. 2, the illumination means for the area 19 is activated to illuminate the area 19. When the leaf 11 is pivoted to the position shown in FIG. 1, the illumination means for the area 19 is deactivated.

Figure 3:
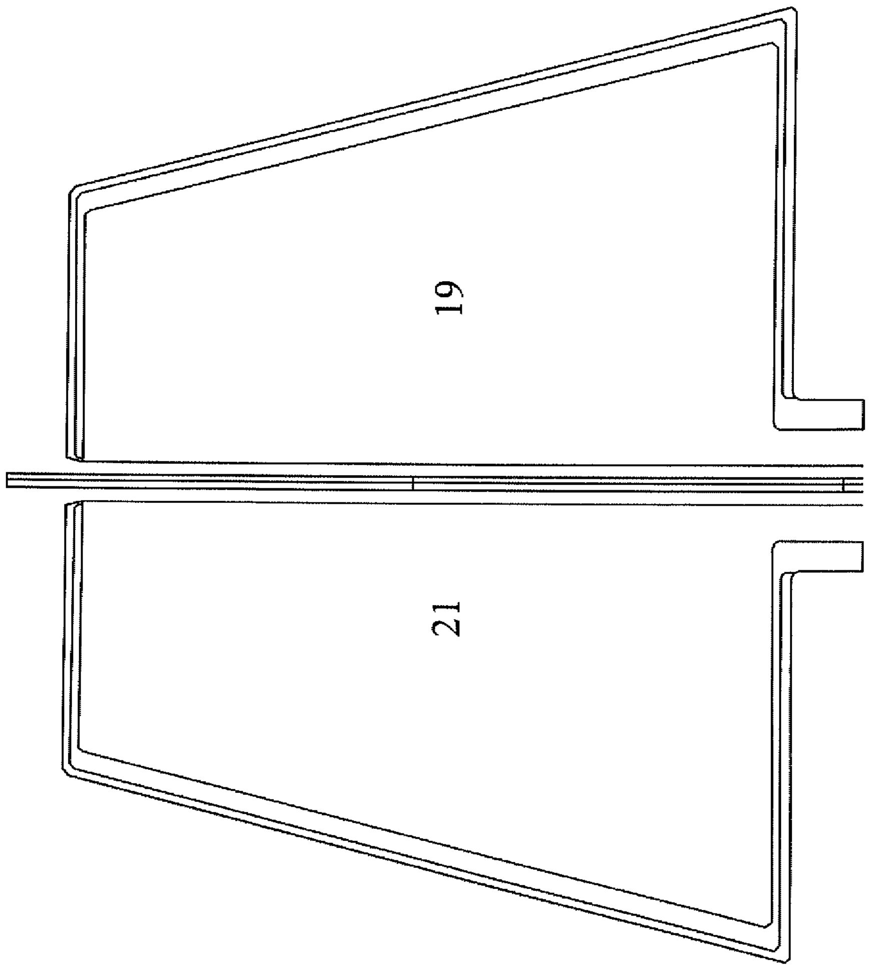
FIG. 3 shows a close-up view of a portion of the illuminated portion and its reflection concerning the configuration shown in FIG. 2.

FIG. 3 shows a further close-up view of the mirrored surface 13, the mirrored surface 15, the area 19, and the reflection 21.

Figure 4:
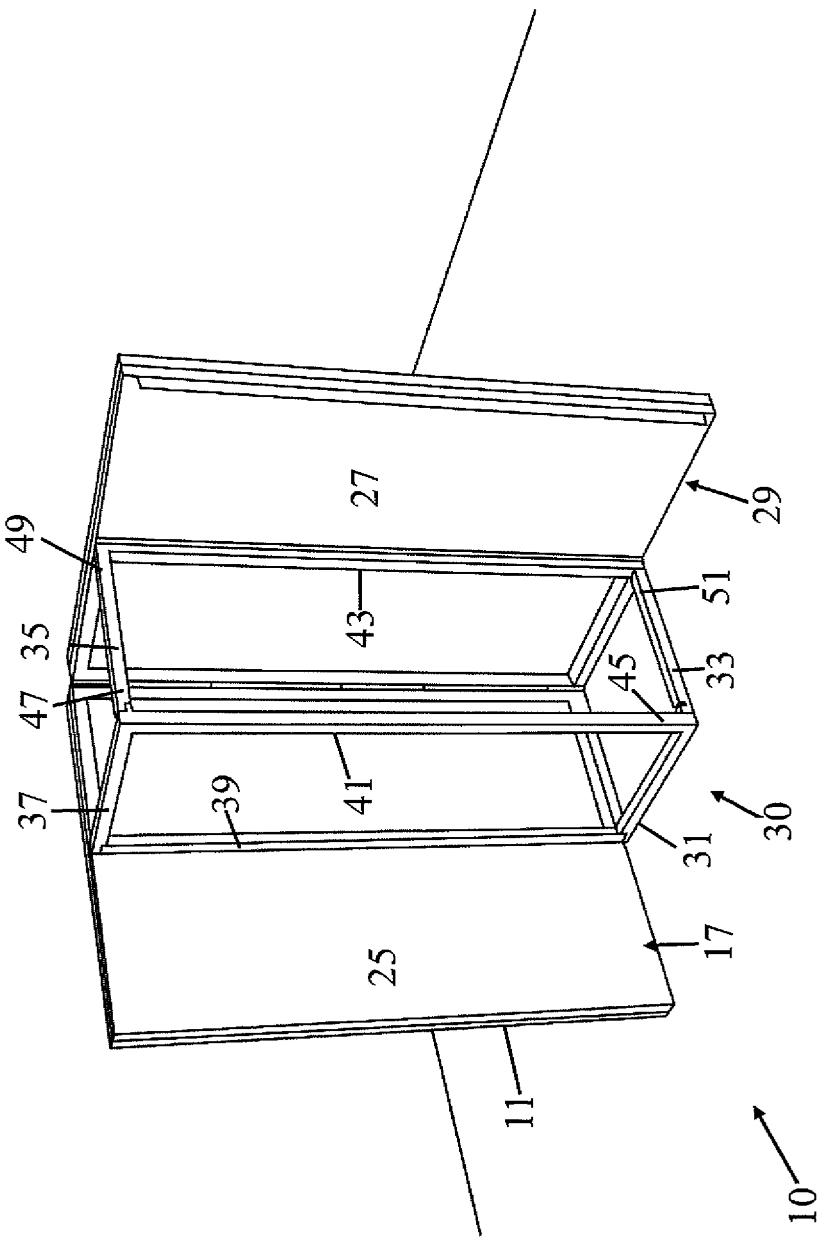
FIG. 4 shows a perspective view of a second leaf opened showing the framework which is unfolded when this leaf is opened.

With reference to FIG. 4, the leaf 17 is seen folded against the leaf 11 with the leaves 11 and 17 pivoted away from a third leaf 29 about hinge 34 located on an edge of the leaf (FIG. 9) to expose a framework 30 which is collapsed between the leaves 17 and 29 when the leaves 17 and 29 are against one another. The leaf 17 has a mirrored surface 25 on the opposite face from the mirrored surface 15 as seen in FIG. 2. The leaf 29 has a mirrored surface 27.

The framework 30 includes horizontal legs 31, 33, 35, and 37, and vertical legs 39, 41, and 43. As should be understood, the legs 33 and 35 are pivotable at each of their ends, with respect to the leaf 29 and the leg 41 while the legs 31 and 37 are pivotable just on one end adjacent the leaf 17. Thus, as should be understood, the legs 31, 37, 39, and 41 together create a rigid sub-frame while the legs 33, 35, and 43 create an inverted C-shaped sub-frame as well. The pivots 45 and 47, as clearly seen in FIG. 4, and, again, the leg 43 are pivotable at 49 and 51 with respect to the surface 27 of the leaf 29.

Figure 5:
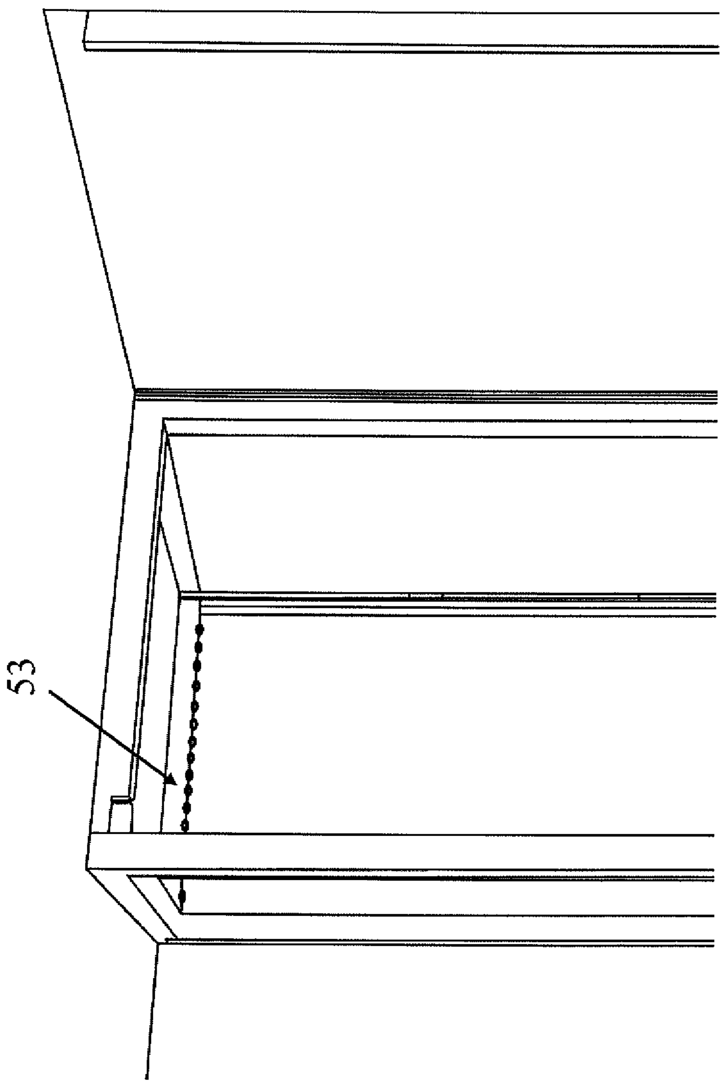
FIG. 5 shows a close-up perspective view showing LEDs mounted on the framework.

With reference to FIG. 5, it is seen that some of the surfaces of the framework have installed thereon a series of illumination means 53 which may, if desired, comprise LEDs. When the leaves 17 and 29 are closely adjacent one another with the framework 30 folded therebetween, the illumination means 53 are deactivated. When the leaves 17 and 29 are pivoted to the position shown in FIG. 4 with the framework 30 erected, a switch is closed thereby activating the illumination means 53. The illumination means 53, again, preferably consisting of a plurality of LEDs, may cover as many surfaces of the legs of the framework 30 as desired. As best seen in FIG. 4, the mirrored surfaces 25 and 27 of the leaves 17 and 19, respectively, show reflective images of portions of the framework which are aesthetically pleasing.

Figure 6:
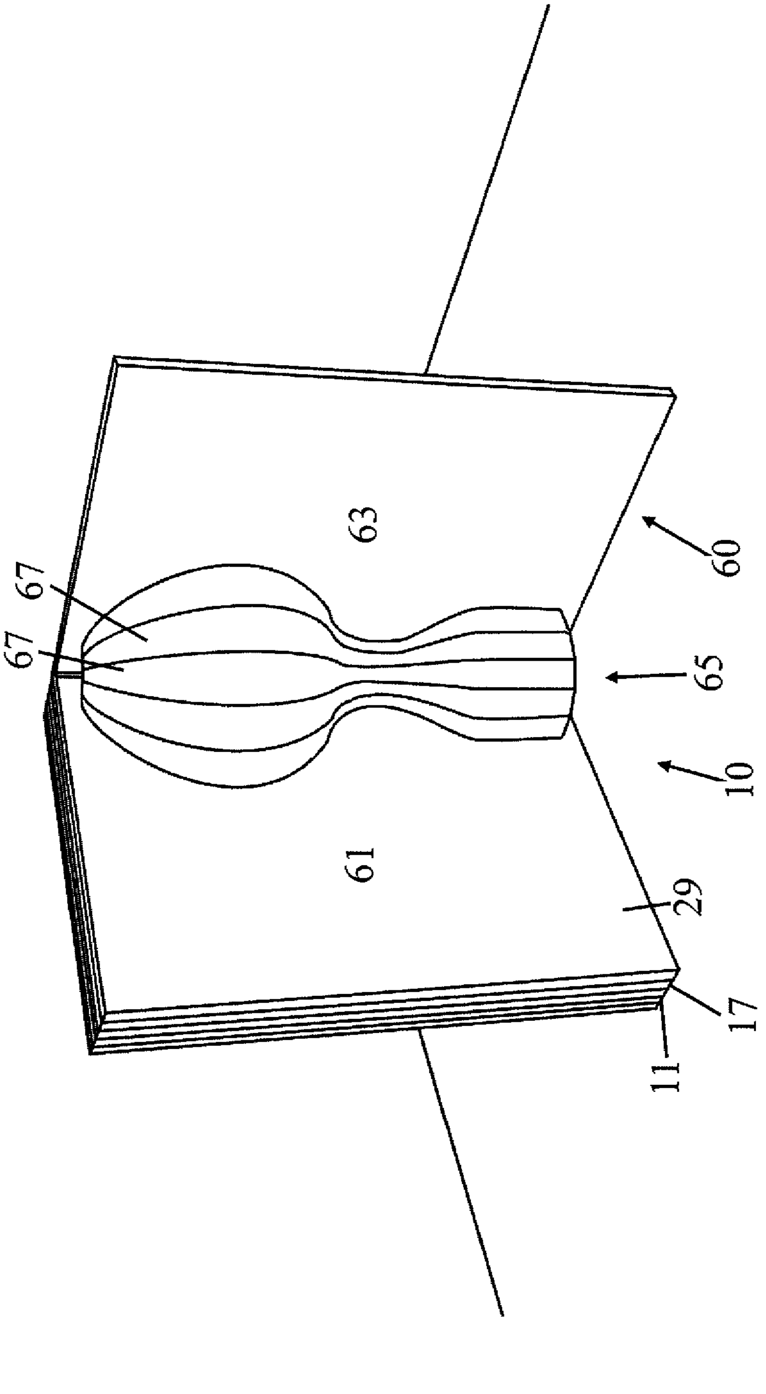
FIG. 6 shows a folded configuration in which a third leaf is opened showing a parchment object which is unfolded when the leaf is opened.

FIG. 6 shows the leaves 11, 17, and 29 adjacent one another with a fourth leaf pivoted away about hinge 32 located on an edge of the leaf (FIG. 9), as shown in FIG. 6, to reveal mirrored surfaces 61 on the leaf 29, and 63 on the leaf 60 as well as an object 65 which is connected to the mirrored surfaces 61 and 63. In the preferred embodiment, the object 65 has pleats 67 which allow the object 65 to be folded in an accordion-like fashion when the leaf 60 is lying against the leaf 29. The mirrored surface 61 of the leaf 29 is on a surface opposite the mirrored surface 27 of the leaf 29. In the preferred embodiment, the object 65 is made of a material such as, for example, parchment, which allows it to be pleated and collapsible when the leaves 29 and 60 lie against one another.

A source of illumination such as one or more LEDs is positioned within the translucent parchment object 65 and a switch closes when the leaves 29 and 60 are at the orientation shown in FIG. 6 to illuminate the inside of the object 65 which allows light to emanate through the translucent surface. The mirrored surfaces 61 and 63 contribute to an aesthetically pleasing image.

Figure 7:
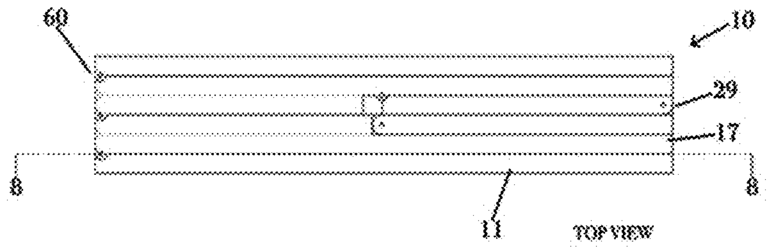
FIG. 7 shows a top view of the inventive lighting device.
Figure 8:
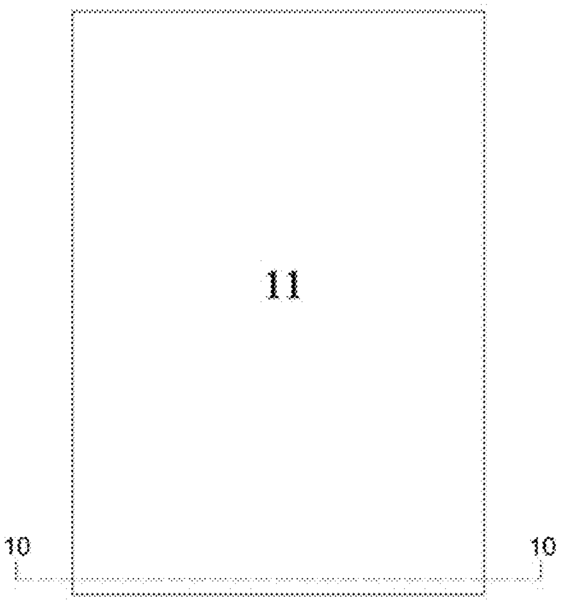
FIG. 8 shows a cross-sectional view along the line 8-8 of FIG. 7.
Figure 9:
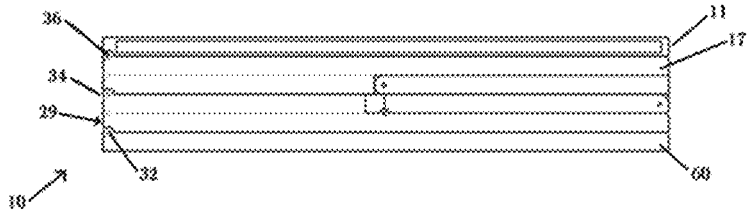
FIG. 9 shows a bottom view of the inventive lighting device.
Figure 10:
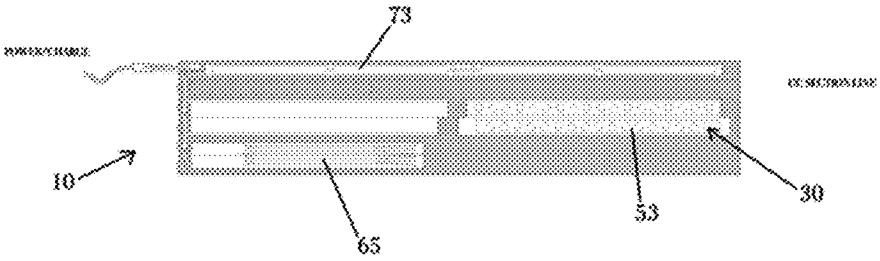
FIG. 10 shows a cross-sectional view along the line 10-10 of FIG. 8.
Figure 11:
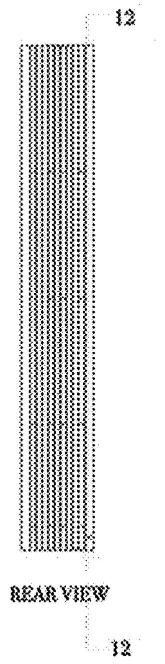
FIG. 11 shows a rear view of the inventive lighting device.

FIGS. 7-12 show schematic representations of the device 10 which illustrate several of the features. FIG. 7 shows the leaves 11, 17, 29, and 60 on top view with FIG. 8 showing a front view of the leaf 11. FIG. 9 is a bottom view of the device 10. The FIG. 10 cross-section shows the folded framework 30 with the LEDs 53 on the legs of the framework, and also shows the accordion pleated object 65 folded in collapsed configuration. FIG. 11 shows a rear view of the device 10.

Figure 12:
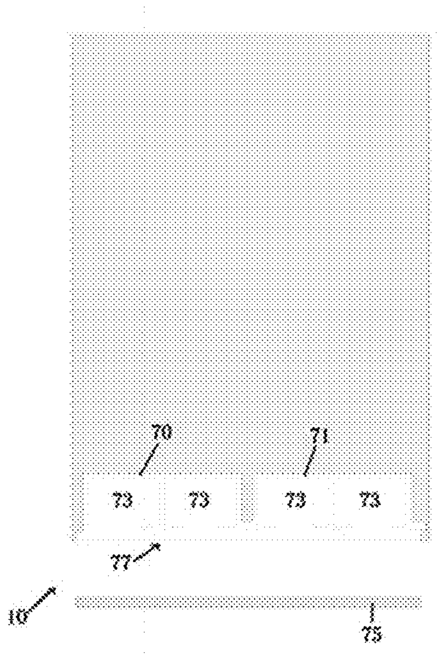
FIG. 12 shows a cross-sectional view along the line 12-12 of FIG. 11.

FIG. 12, which is a cross-section along the line 12-12 of FIG. 11, shows compartments 70 and 71 which receive batteries 73 to power the inventive device 10. A cover 75 is removable to expose an opening 77 allowing insertion and removal of the batteries 73.

Figure 13:
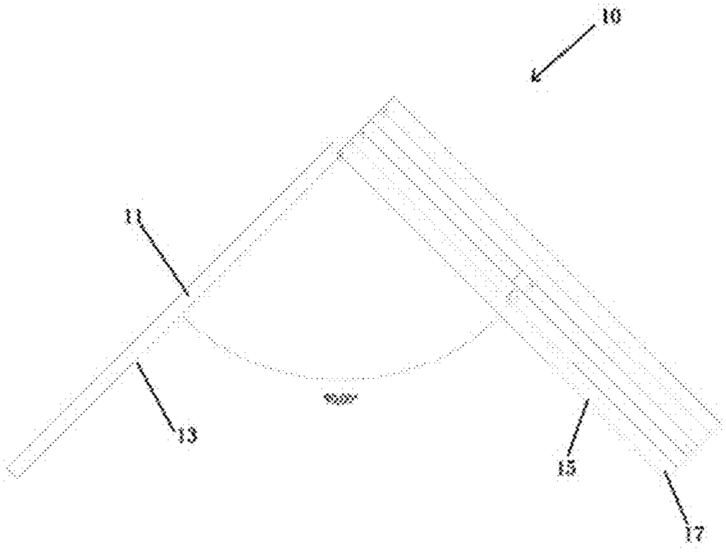
FIG. 13 shows a top view with the first leaf opened.
Figure 14:
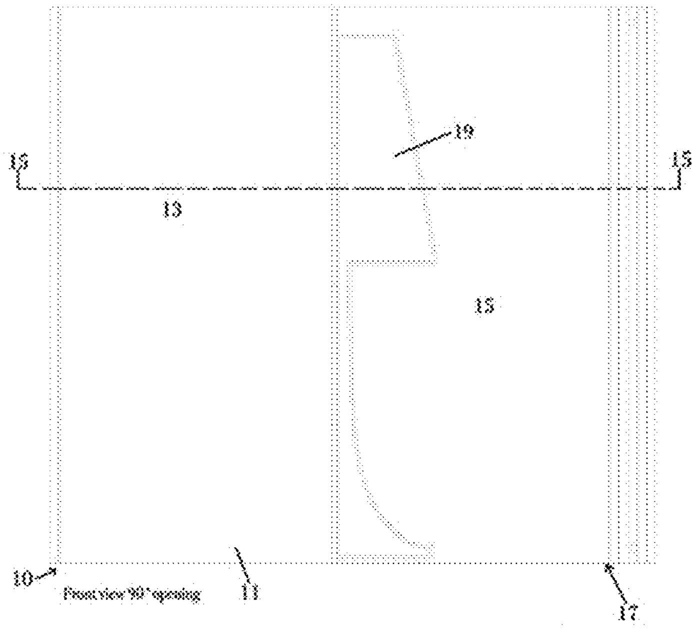
FIG. 14 shows a front view of the configuration shown in FIG. 13.
Figure 15:
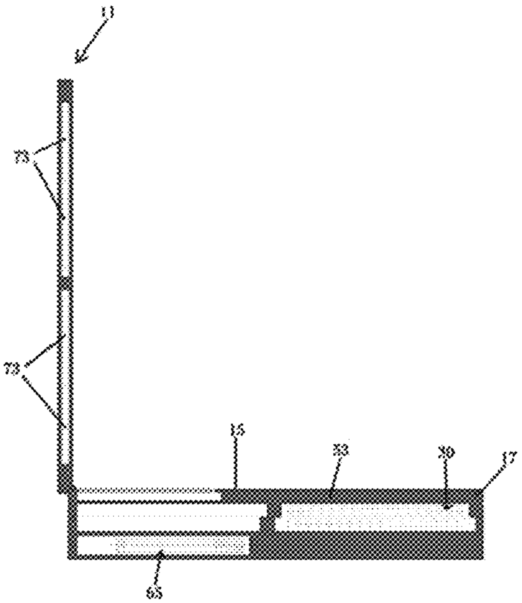
FIG. 15 shows a cross-sectional view along the line 15-15 of FIG. 14.

FIGS. 13-15 show the configuration of the present invention with the first leaf 11 pivoted to the open position. FIG. 15 which is a cross-section along the line 15-15 of FIG. 14 clearly shows that the batteries 73 are located within the leaf 11 and accessed from below. FIG. 15 also shows the framework 30 and the object 65 both folded into position with their adjacent leaves adjacent one another.

Figure 16:
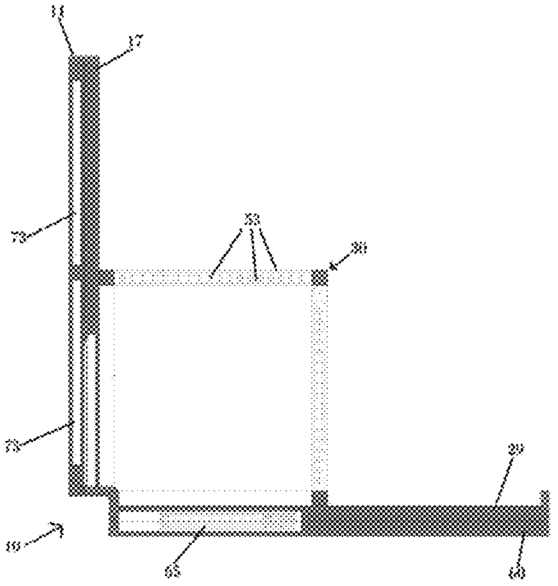
FIG. 16 shows a cross-section of the lighting device with the second leaf opened.

FIG. 16 shows the device with the leaves 11 and 17 adjacent one another and the leaf 29 pivoted away to expose the framework 30 with the LEDs 53 clearly visible. FIG. 16 also shows the object 65 and the batteries 73 within the leaf 11.

Figure 17:
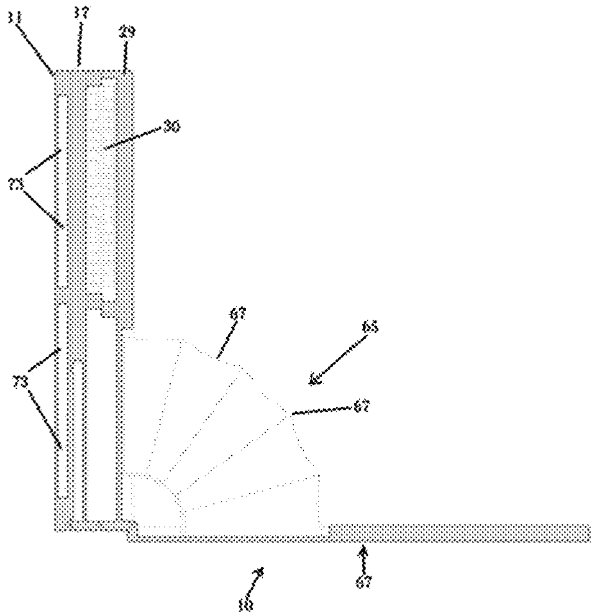
FIG. 17 shows a cross-sectional view of the inventive lighting device with the third leaf opened.
Figure 18:
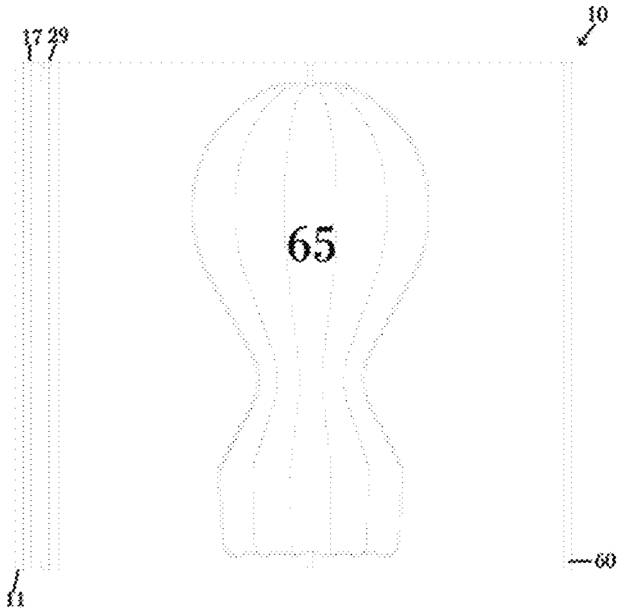
FIG. 18 shows a front view of the inventive lighting device with the third leaf opened.

FIGS. 17 and 18 show the inventive device with the leaf 60 pivoted away from the leaf 29 to expose the object 65 whose pleats 67 are clearly visible in FIG. 17. Also visible in FIG. 17 are the leaves 11, 17, and 29 as well as the folded up framework 30 and the batteries 73.

Figure 19:
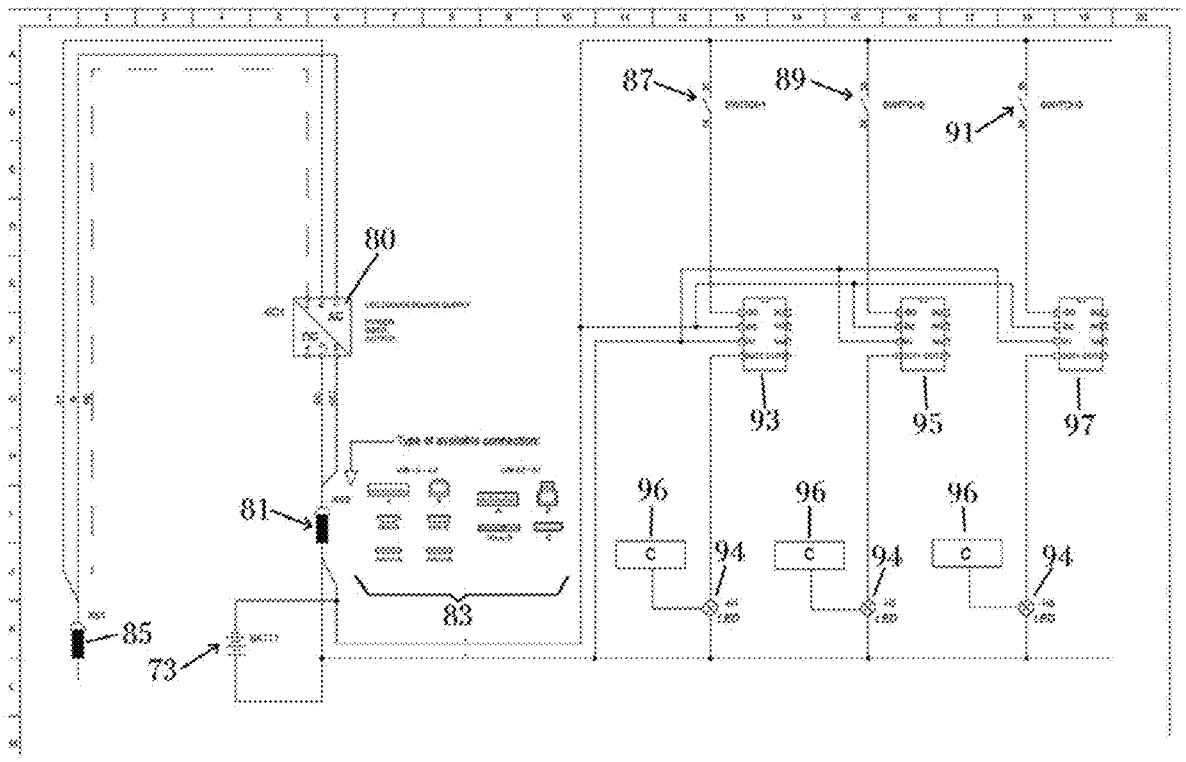
FIG. 19 shows a schematic representation of the electrical circuitry of the present invention.

With reference now to FIG. 19, a schematic representation of the electrical circuitry of the present invention is shown. The reference numeral 73 shows a schematic representation of the batteries 73 also seen in FIGS. 10, 12, and 17, for example. As an alternative, an AC source of power 80 is provided which when connected provides DC power through a transformer as is well understood by those of ordinary skill in the art. The power supply 80 may be interconnected into the circuit via a socket plug connection 81. The socket plug connection 81 may be of any desired type or configuration. Several examples of such connectors are collectively shown with the reference numeral 83. The power supply 80 when employed is plugged into a wall socket using the plug 85 to obtain 110-120 volts AC current. DC power whether by batteries or transformed AC power is preferably within the range of 6-12 volts DC. The reference numerals 87, 89, and 91 refer to switches which are the switches that facilitate illumination of each aspect of the present invention, with the switch 87 closing when the leaf 11 is pivoted with respect to the leaf 17, the switch 89 closing when the leaf 17 is pivoted with respect to the leaf 29, and the switch 91 closes when the leaf 29 is pivoted with respect to the leaf 60. This should be well understood.

The reference numerals 93, 95, and 97 represent driver LED dimmers incorporated into the circuit and controllable as well known to those skilled in the art to brighten or dim LEDs which are employed in the various modes of operation of the present invention. The LEDs are depicted using the reference numeral 94 and each LED may be provided with a known controller 96 which may be used not only to change the color of LEDs 94 but also may provide a timing function allowing the LEDs to be illuminated for a prescribed time period whereupon they are deactivated to save the power of the batteries 73, particularly when the power supply 80 is not being employed. The controllers 96 may also provide artificial intelligence (AI) integration to facilitate operation of the inventive device 10. The AI integration may also include voice control pre-programmed to react to a particular voice of one or more persons as pre-programmed therein. In this way, for example, a leaf may be opened, illumination may occur, and the user's voice may be employed to dim or brighten the LEDs, change their color, set the timer, or do any other appropriate function.

The inventive lighting device may be made in any desired dimensions. Examples of preferred dimensions include:

1) Small size: width 297 mm (11.7 inches), height 420 mm (16.5 inches), and thickness 60 mm (2.3 inches);
2) Medium size: width 594 mm (23.4 inches), height 841 mm (33.1 inches), and thickness 120 mm (4.7 inches);

3) Large size: width 1272 mm (33.1 inches), height 1800 mm (46.8 inches), and thickness 240 mm (9.4 inches).

Again, these dimensions are examples and are not limiting of the present invention.

As such, an invention has been disclosed in terms of a preferred embodiment thereof, which fulfills each and every one of the objects of the invention as set forth hereinabove, and provides a new and useful illuminated book lighting device of great novelty and utility.

Of course, various changes, modifications, and alterations in the teachings of the present invention may be contemplated by those skilled in the art without departing from the intended spirit and scope thereof.

As such, it is intended that the present invention only be limited by the terms of the appended claims.

The invention claimed is:

1. A lighting device, comprising:

a) first and second leaves pivotably connected together by a first hinge;
b) said first and second leaves having facing mirrored surfaces;
c) within one of said mirrored surfaces, an area is provided that is configured to be illuminated by a first source of light located within a periphery of said one of said mirrored surfaces;
d) said first source of light being activated by closure of a first actuator switch;
e) a source of power connected to said first source of light;
f) whereby when said first source of light is activated, said area is illuminated and a mirror image of said area appears to be illuminated in another one of said mirrored surfaces when a viewer is viewing said leaves from in front of them;
g) further including a third leaf pivotable with respect to said second leaf by a second hinge adjacent said first hinge, and a second source of light activated by closure of a second actuator switch to illuminate a space between said second and third leaves.

2. The lighting device of claim 1, wherein a collapsible framework is located between said second and third leaves, said collapsible framework being erected when said second and third leaves are pivoted apart, said collapsible framework comprising, when erected, a structure made up of horizontal and vertical legs.

3. The lighting device of claim 2, wherein said second source of light comprises a plurality of lights mounted on said framework.

4. The lighting device of claim 3, wherein said lights comprise LEDs.

5. The lighting device of claim 3, wherein said second actuator switch is closed when said second and third leaves are pivoted apart.

6. The lighting device of claim 1, wherein said first source of light comprises at least one LED.

7. The lighting device of claim 6, wherein said at least one LED is connected to a controller, said controller operable to change a color of light emanating from said at least one LED.

8. The lighting device of claim 7, wherein said controller controls dimming and brightening of said at least one LED.

9. The lighting device of claim 7, wherein said controller is controlled by use of artificial intelligence.

10. The lighting device of claim 1, wherein a fourth leaf is pivotable with respect to said third leaf about a third hinge adjacent said second hinge, and a third source of light between said third and fourth leaves is activated by closure of a third actuator switch.

11. The lighting device of claim 10, wherein said third actuator switch is closed when said third and fourth leaves are pivoted apart.

12. The lighting device of claim 1, wherein said source of power comprises at least one battery.

13. The lighting device of claim 1, wherein said source of power comprises a source of AC power transformed to DC power.

14. The lighting device of claim 1, wherein said first actuator switch closes to activate said first source of light when said first and second leaves are pivoted to expose said mirrored surfaces.

15. The lighting device of claim 1, wherein facing surfaces on said second and third leaves are mirrored.

16. A lighting device comprising:

a) first and second leaves pivotably connected together by a first hinge located on adjacent edges of said leaves;

b) said first and second leaves having facing mirrored surfaces;

c) within one of said mirrored surfaces, an area is provided that is configured to be illuminated by a first source of light located within a periphery of said one of said mirrored surfaces;

d) said first source of light being activated by closure of a first actuator switch;

e) a source of power connected to said source of light;

f) whereby when said first source of light is activated, said area is illuminated and a mirror image of said area appears to be illuminated in another one of said mirrored surfaces when a viewer is viewing said leaves from in front of them;

g) further including a third leaf pivotable with respect to said second leaf by a second hinge adjacent said first hinge, and a second source of light activated by closure of a second actuator switch to illuminate a space between said second and third leaves;

h) further including a fourth leaf pivotable with respect to said third leaf by a third hinge adjacent said second hinge, and a third source of light between said third and fourth leaves being activated by closure of a third actuator switch.

17. The lighting device of claim 16, wherein said first source of light, second source of light, and third source of light comprise LEDs each connected to a controller, said controller operable to change a color of light emanating from said LEDs.

18. The lighting device of claim 17, wherein said controller controls dimming and brightening of said at least one LED.

19. The lighting device of claim 16, wherein said source of power comprises at least one battery.

* * * * *